(12) United States Patent
Horrigan et al.

(10) Patent No.: US 7,380,063 B2
(45) Date of Patent: May 27, 2008

(54) CACHE FLUSHING (75) Inventors: John W. Horrigan, Mountain View, CA (US); Namasivayam Thangavelu, San Jose, CA (US); George Vargese, Folsom, CA (US); Brian Holscher, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/471,773

(22) Filed: Jun. 20, 2006

(65) Prior Publication Data

US 2007/0005900 A1 Jan. 4, 2007

Related U.S. Application Data (63) Continuation of application No. 10/682,240, filed on Oct. 8, 2003, now Pat. No. 7,089,366, which is a continuation of application No. 09/465,216, filed on Dec. 15, 1999, now Pat. No. 6,658,532.

(51) Int. Cl.
G06F 12/12 (2006.01)
G06F 1/32 (2006.01)
G06F 13/24 (2006.01)

(52) U.S. Cl. .............. 711/129; 711/135; 710/262; 713/323; 713/324

(58) Field of Classification Search .............. None
See application file for complete search history.

(56) References Cited

U.S. PATENT DOCUMENTS

| 5,551,001 | A | * | 8/1996 | Cohen et al. ............... 711/122 |
|---|---|---|---|---|
| 5,745,730 | A | | 4/1998 | Nozue et al. ............... 711/135 |
| 5,813,022 | A | * | 9/1998 | Ramsey et al. ............... 711/3 |
| 5,845,326 | A | | 12/1998 | Hirayama et al. .......... 711/135 |
| 5,848,428 | A | * | 12/1998 | Collins ...................... 711/127 |
| 5,870,616 | A | * | 2/1999 | Loper et al. ............... 713/324 |
| 5,875,464 | A | | 2/1999 | Kirk .......................... 711/129 |
| 5,913,225 | A | | 6/1999 | Ohba et al. ................. 711/135 |
| 6,003,116 | A | | 12/1999 | Morita et al. ............... 711/141 |
| 6,185,657 | B1 | * | 2/2001 | Moyer ........................ 711/128 |
| 6,442,700 | B1 | | 8/2002 | Cooper ....................... 713/320 |
| 6,483,516 | B1 | | 11/2002 | Tischler ...................... 345/552 |
| 6,496,888 | B1 | | 12/2002 | Pole, II ....................... 710/110 |
| 6,591,347 | B2 | | 7/2003 | Tischler ...................... 711/134 |
| 6,658,532 | B1 | | 12/2003 | Horrigan et al. ............ 711/135 |
| 2004/0073751 | A1 | | 4/2004 | Horrigan et al. ............ 711/135 |

* cited by examiner

Primary Examiner—Denise Tran
(74) Attorney, Agent, or Firm—Fish & Richardson P.C.

(57) ABSTRACT

Portions of a cache are flushed in stages. An exemplary flushing of the present invention comprises flushing a first portion, performing operations other than a flush, and then flushing a second portion of the cache. The first portion may be disabled after it is flushed. The cache may be functionally divided into portions prior to a flush, or the portions may be determined in part by an abort signal. The operations may access either the cache or the memory. The operations may involve direct memory access or interrupt servicing.

8 Claims, 8 Drawing Sheets

CACHE FLUSHING

CROSS-REFERENCE TO RELATED APPLICATIONS

This application is a continuing application of and claims priority to U.S. patent application Ser. No. 10/682,240, filed Oct. 8, 2003, now U.S. Pat. No. 7,089,366, which is a continuation application of U.S. patent application Ser. No. 09/465,216, filed Dec. 15, 1999, now U.S. Pat. No. 6,658,532.

BACKGROUND

This invention relates to cache flushing.

A cache is flushed in order to make sure that the contents of the cache and a main memory are the same. Typically, a cache flush is initiated by a processor issuing a flush command. A cache controller will then write back data from the cache into the main memory.

SUMMARY OF THE INVENTION

Portions of a cache are flushed in stages. An exemplary flushing of the present invention comprises flushing a first portion, performing operations other than a flush, and then flushing a second portion of the cache. The first portion may be disabled after it is flushed. The cache may be functionally divided into portions prior to a flush, or the portions may be determined in part by an abort signal. The operations may access either the cache or the memory. The operations may involve direct memory access or interrupt servicing.

DETAILED DESCRIPTION

Figure 1:
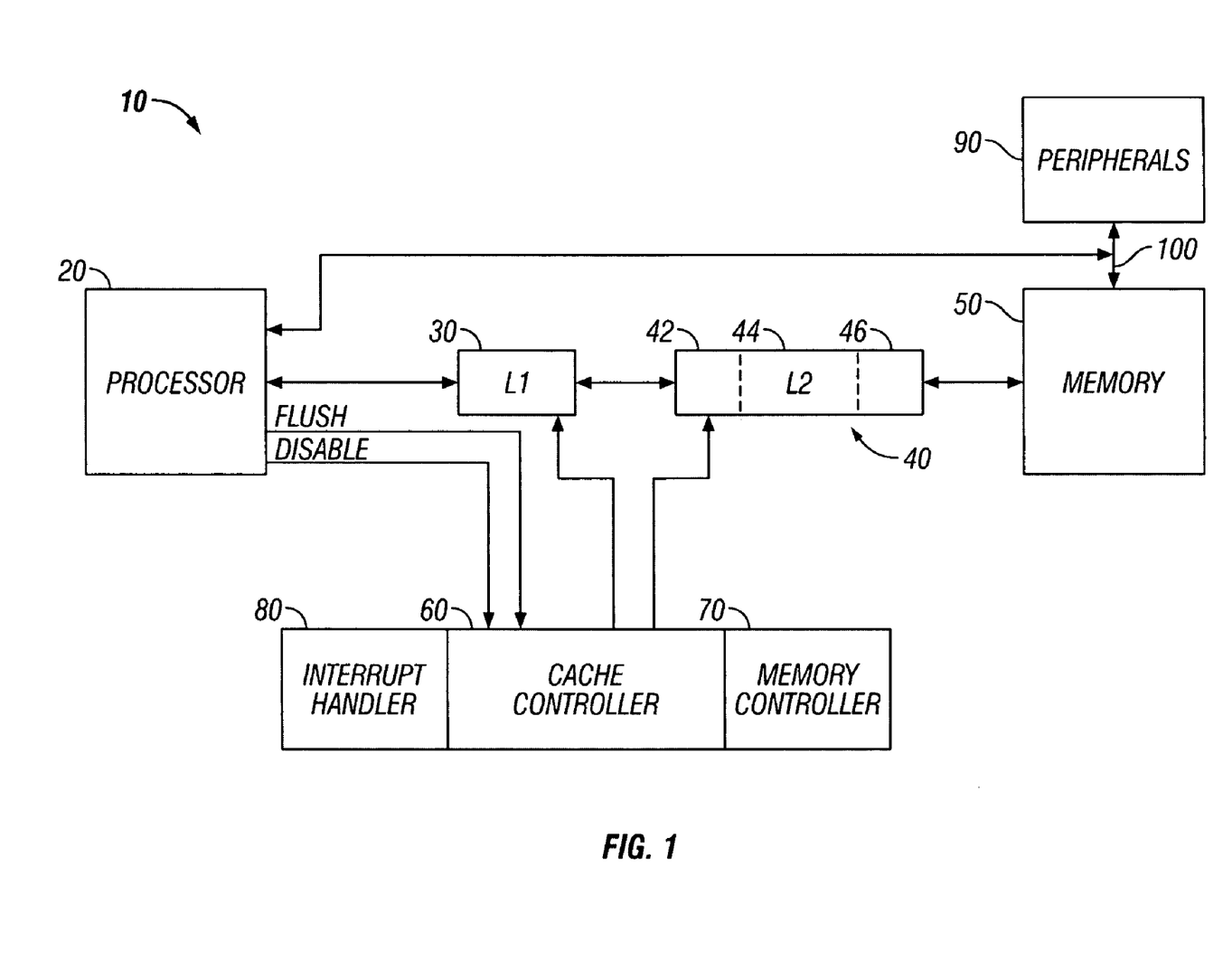
FIG. 1 is a block diagram of a processor system incorporating the invention.

In FIG. 1, processor system 10 may be the core of a personal computer. Processor 20 uses caches 30 and 40 in conjunction with memory 50 to speed up data access. Cache 30, the L1 cache, is typically smaller and faster than cache 40, the L2 cache. Both caches provide faster access than memory 50. Cache 30 is, for example, 32 Kbytes and operates at the processor speed. Cache 40 is, for example, 512 Kbytes and typically operates at about 50% of the processor speed. For example, a processor 20 operating at 450 MHZ may have a cache operating at 225 MHZ. On such a system, memory 50 may be operating on bus 100 with a bus speed of only 100 MHZ. Processor 20 can access memory 50 directly over bus 100. Memory controller 70 arbitrates access to memory 50. One function of memory controller 70 is to grant peripherals 90 direct memory access (DMA) to memory 50 via bus 100. Peripherals 90 may also be granted access to memory 50 by signaling interrupt handler 80. Interrupt handler 80 would then cause processor 20 to service the requested interrupt.

As one example of a peripheral, a digital video camera may be connected to bus 100 via a Universal Serial Bus (USB) interface (not shown). A camera or other peripheral may require periodic access to bus 100 in order to store information, such as video data, in memory 50. Certain peripherals may require access to memory 50 about every 200 microseconds or even more often. A long cache flush is broken up into stages so that the peripheral will be able to transfer data smoothly to or from the memory. For example, the processor may be interrupted in order to create or rearrange data buffers during a memory-peripheral transfer. The cache flush is broken up into stages to allow for timely servicing of the interrupt.

Cache 30 and 40 are controlled by cache controller 60. One function of cache controller 60 is to perform cache write backs. Upon receipt of a flush command from processor 20, cache controller 60 will write back data from the flushed cache to memory 50. The entire cache may then be written back. Alternatively, a subset of the cache may be written back that includes those areas of the cache where the memory and cache are not identical. Cache controller 60 and the cache 30 are on the same chip as processor 20. Cache 40 may also be on the chip with processor 20.

Cache 40 is shown, for example, as having three functional portions 42, 44, and 46. Portion 46 is smaller than portions 42 and 44. Each portion may be flushed and disabled independently of the status of the other two portions. Cache 40 may therefore be flushed in stages. For example, first portion 42 may be flushed and then disabled. Then portion 44 may be flushed and then disabled. Finally potion 46 may be flushed. In between successive flushes, the processor system performs memory intensive operations. For example, peripherals 90 may be allowed to store data in memory 50, or processor 20 may service interrupts responsive to messages from interrupt handler 80.

Figure 2:
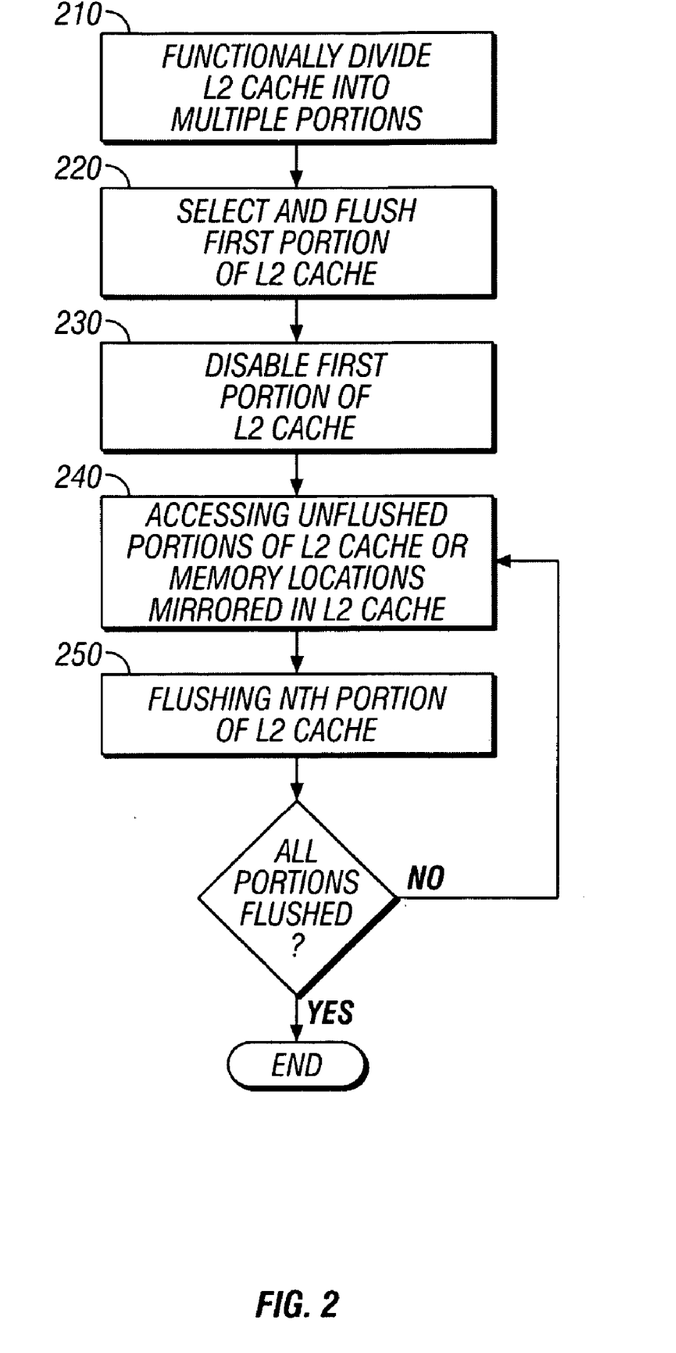
FIG. 2 is a flow chart illustrating a flush of the cache of FIG. 1.

As shown in FIG. 2, in a staged L2 cache flush, the cache is functionally identified (210) as having two or more portions. A portion is selected and flushed (220). The flushed portion is then disabled (230). The remaining portions of the cache remain enabled. During the cache flush (220), processor 20 could not service interrupts. Once the flushed portion has been disabled, the processor can service interrupts. These interrupt service routines may access the cache or memory locations that are mirrored in the cache (240).

After the interrupts are serviced, an unflushed portion of the cache is flushed (250). If the cache is divided into more than two portions, this portion of the cache is disabled and interrupts may be serviced again. Once the entire cache has been flushed, the entire cache is reenabled. Flushing the L2 cache in stages allows for faster response time to interrupts, DMA requests, or other memory requests requiring servicing.

The size (the amount of data storage capacity) of the portions of the cache can vary, and may be configurable. The ratio of the sizes of the various portions may be a power of two. For example, first portion may be four or eight times the size of the second portion, or, in another example, a three portion cache may have portion ratios of 8:4:1.

Figure 3:
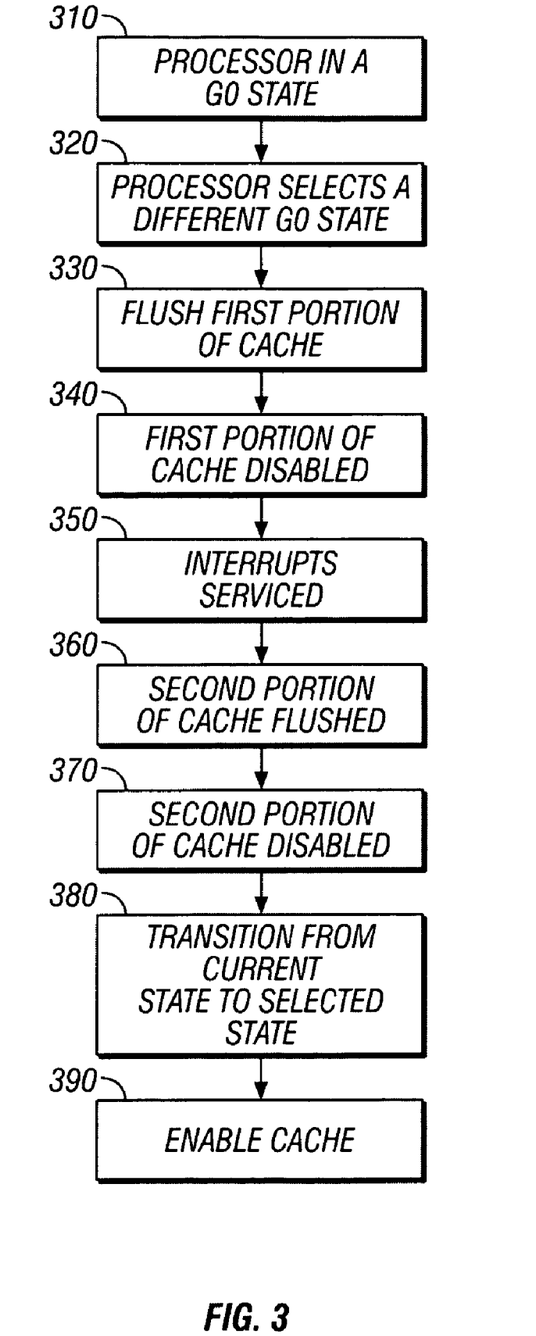
FIG. 3 is a flow chart illustrating a flush of the cache of FIG. 1 combined with a processor transition.

FIG. 3 illustrates a staged L2 cache flush in conjunction with a processor transition. For example, processor 50 may be operating (310) in the C1 processor state within the G0 operating state as defined in the Advanced Configuration and Power Interface Specification ("ACPI"), Revision 1.0b, released Feb. 2, 1999. Portions of the ACPI are reprinted in the Appendix. One or more computer programs, for example, operating system software, application software, microcode, or otherwise, are stored on a computer readable medium and are executed on processor 50. Processor 50 requests, in response to either user input, system status information, or otherwise, to enter the C3 state, also within the G0 operating state. Processor 50 selects(320) a different G0 state. In this example, the C3 state. Processor 50 then signals cache controller 60 to flush (330) a first portion of the L2 cache. Once the flush is complete, the first portion is disabled (340), and the interrupts are serviced (350). The second and last portion of the cache is then flushed (360). The last portion to be flushed is usually smaller in size than the first portion. Accordingly, the flush of this last portion is faster than the flush of the first portion. The second portion is disabled (370). Processor 50 then transitions (380) from the C1 state to the C3 state. Interrupts cannot be serviced during a cache flush or during the transition. In some cases, peripherals may not access memory during those times. Likewise, access must be denied between the final flush and the transition. By making the final flush brief, the flush can be immediately followed by a transition without significantly impacting the total duration between memory or cache accesses. Following the transition, interrupts and caching are enabled (390).

Figure 4:
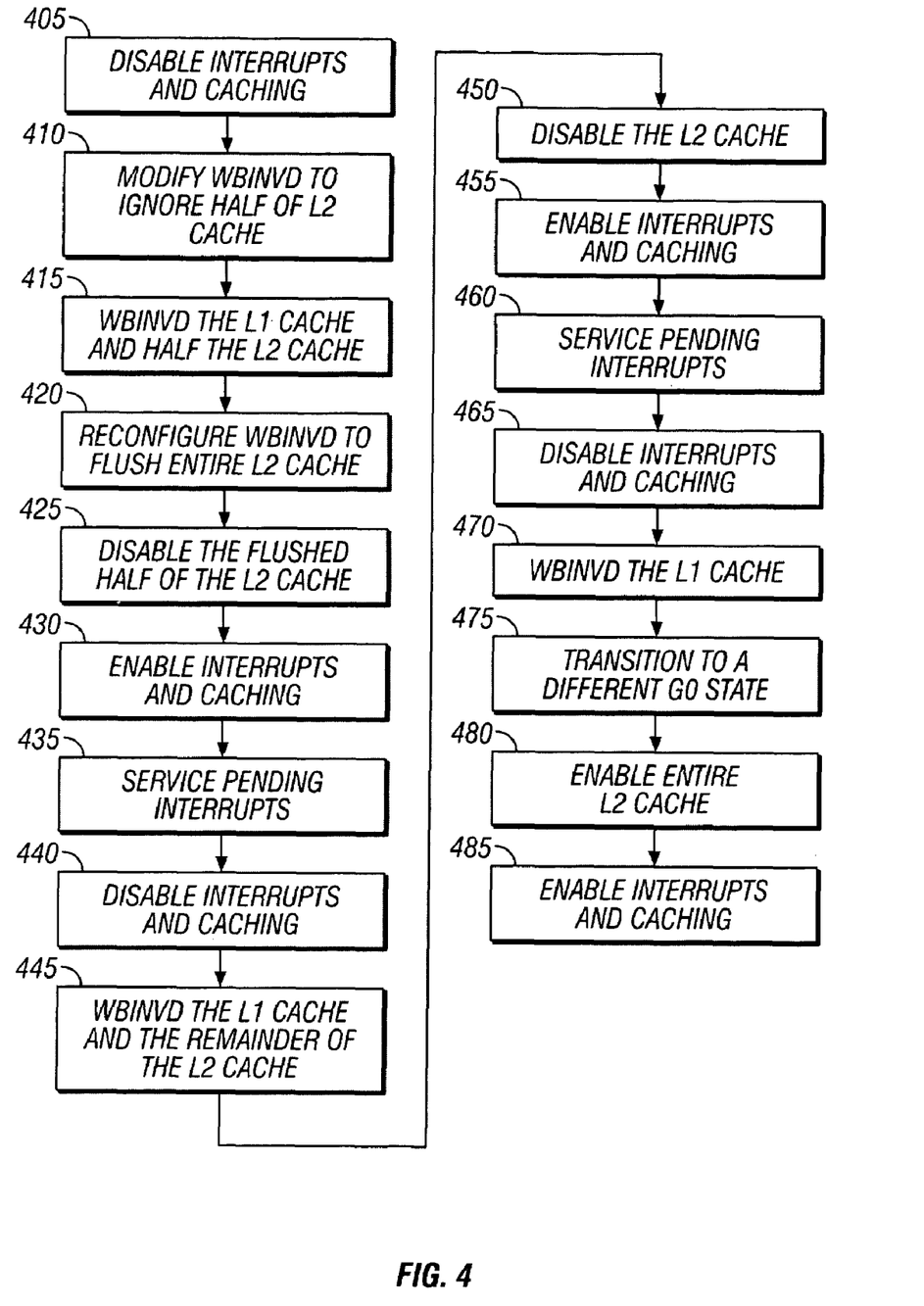
FIG. 4 is a flow chart illustrating another embodiment of the cache flush.

In another embodiment shown in FIG. 4, the behavior of a cache flush instruction is modified. The cache flush instruction WBINVD (Write Back and Invalidate) ordinarily flushes the entire cache. After interrupts and caching are disabled (405), the behavior of the system in response to a WBINVD instruction is modified (410) to flush half of the L2 cache. The WBINVD is executed (415) to flush the L1 cache and one half of the L2 cache. The behavior of the system is then reconfigured (420) so that execution of the WBINVD instruction will flush the entire L2 cache. Once the flushed half of the L2 cache is disabled (425), interrupts and caching are enabled (430). Interrupts are then serviced (435). Interrupts and caching are again disabled (440) and the L1 cache and remainder of the L2 cache are flushed (445). Caching and interrupts are enabled (455) and interrupts are serviced again (460).

The final flush and transition now takes place. Caches and interrupts are disabled (465), the L1 cache is flushed (470) with the WBINVD instruction, the processor transitions (475) from one G0 state to another. Once the transition is complete, the entire L2 cache is enabled (480). Interrupts and caching are also enabled (485).

Figure 5:
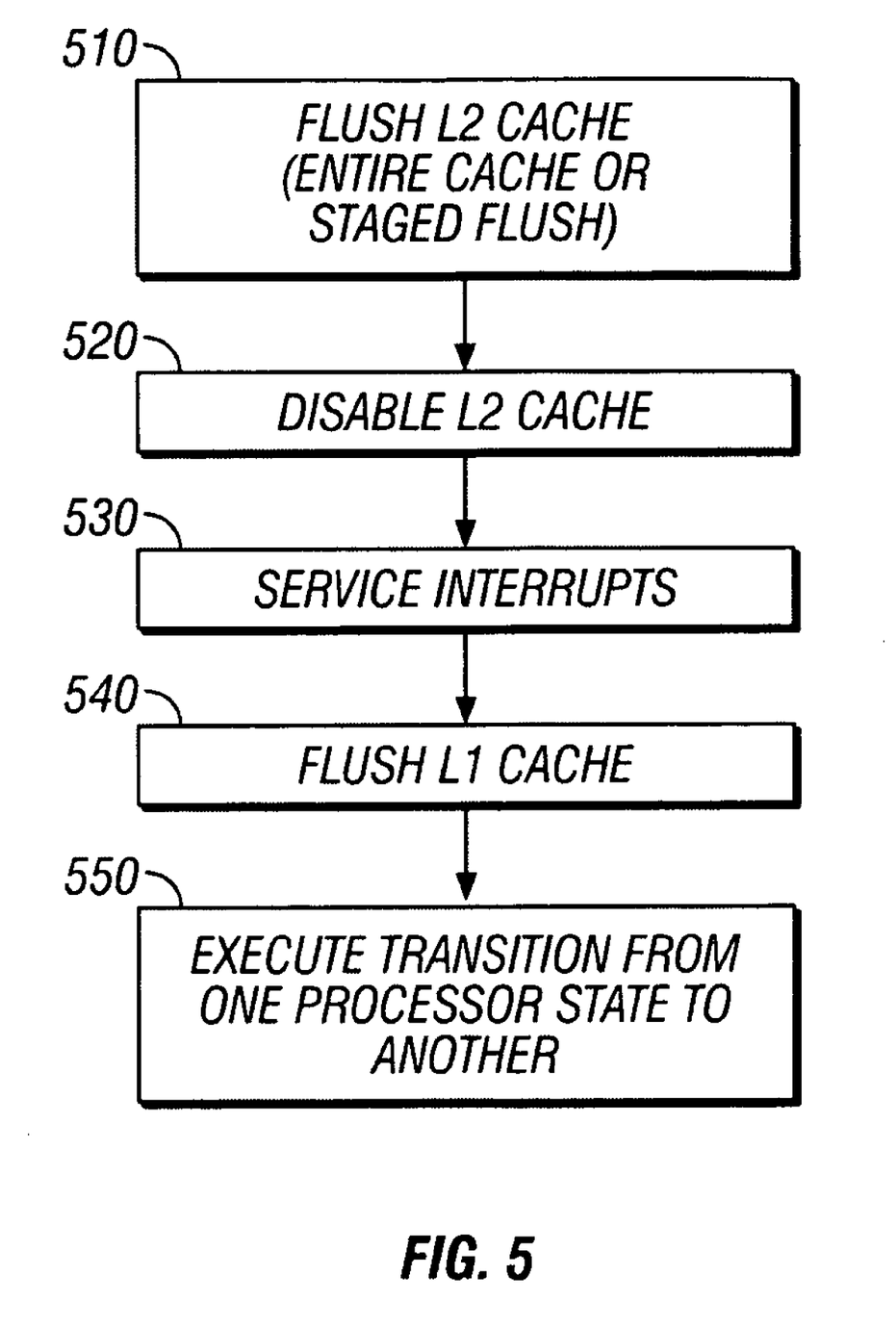
FIG. 5 illustrates various L1 and L2 flush combinations.

The order of cache flushing is variable FIG. 5 illustrates some possibilities: First the L2 is flushed (510) and then disabled (520). Interrupts are serviced (530) or other operations performed before the next flush. Then the L1 cache is flushed (540). Also, a series of caches within a cache hierarchy may be flushed in stages. In such a circumstance, a portion of the cache hierarchy is flushed by flushing one or more caches within a cache hierarchy. Two examples of a staged flush of a cache hierarchy are shown in FIG. 5.

The L2 cache can be flushed in stages, followed by a flush of the L1 cache. Again interrupts can be serviced or other operations performed in between the three flushes. In either case, the L1 cache flush can be followed by a transition from one processor state to another.

Another embodiment of the invention has an abortable L2 cache so that a high latency L2 cache flush may be aborted and then resumed. The individual flushable portions of the cache are not predetermined. Rather, the size of the portions vary depending on the time between flush abort signals. Upon receipt of an abort signal, the flush may be aborted immediately, be aborted after a specified or predetermined time period, or be aborted after the flushing of a portion of the cache of a predetermined size. An indicator is stored indicating how much of the cache was flushed prior to the abort. The indicator is, for example, stored in a register named Flush MSR (Flush Model Specific Register). The indicator stores the last flushed segment, half-segment, word, or some other value. Software can use this register to communicate with the WBINVD microcode flow to tell it whether to use standard semantics or abort/retry semantics. Software retries the WBINVD until the L2 cache is completely flushed, providing windows between each iteration for the processor to service interrupts. With reference to FIG. 1, the flush MSR stores the boundary between portion 42 and 44 after portion 42 is flushed. After the first retry, the Flush MSR stores the boundary between portions 44 and 46.

The processor is allowed to handle interrupts in between the flush abort and flush retry. When the flush is retried, the L1 cache is flushed, where needed, then the L2 abortable cache starts flushing where the prior flush left off. In a particular embodiment, the L2 cache is only aborted after 250 usec following the start of the flush. The cache flush abort/retry control may be implemented in either microcode or hardware state machines.

The cache flush abort/retry scheme is a generic architectural feature and could be used by a device driver or operating system where there is a need for reduced cache flush latency. The availability of this feature can be indicated by a feature flag in, for example, the processor. For microcode implementations, a microcode visible control register is used to accomplish a retriable flush. The microcode also uses the following hardware features: a) a saturating down-counter to know when the initial no-abort time has passed; b) a bit that the microcode can poll to determine if an interrupt is pending; c) a bit that blocks the interrupt pending bit; and d) a bit that the microcode can set that controls whether the L2 allocates new lines or not.

In an embodiment, the counter uses the bus clock as its time reference. The periods for the bus clock frequencies are 15 nsec, 10 nsec, 7.5 nsec, and 5 nsec for 66 MHZ, 100 MHZ, 133 MHZ, and 200 MHZ respectively. The counter counts 2.5 nsec time intervals and decrements by 6, 4, 3, or 2 ticks per 66 MHZ, 100 MHZ, 133 MHZ, and 200 MHZ bus clock respectively. The interrupt pending bit is set if there is an external interrupt, the counter has reached zero, and the blocking bit is not set.

Figure 6:
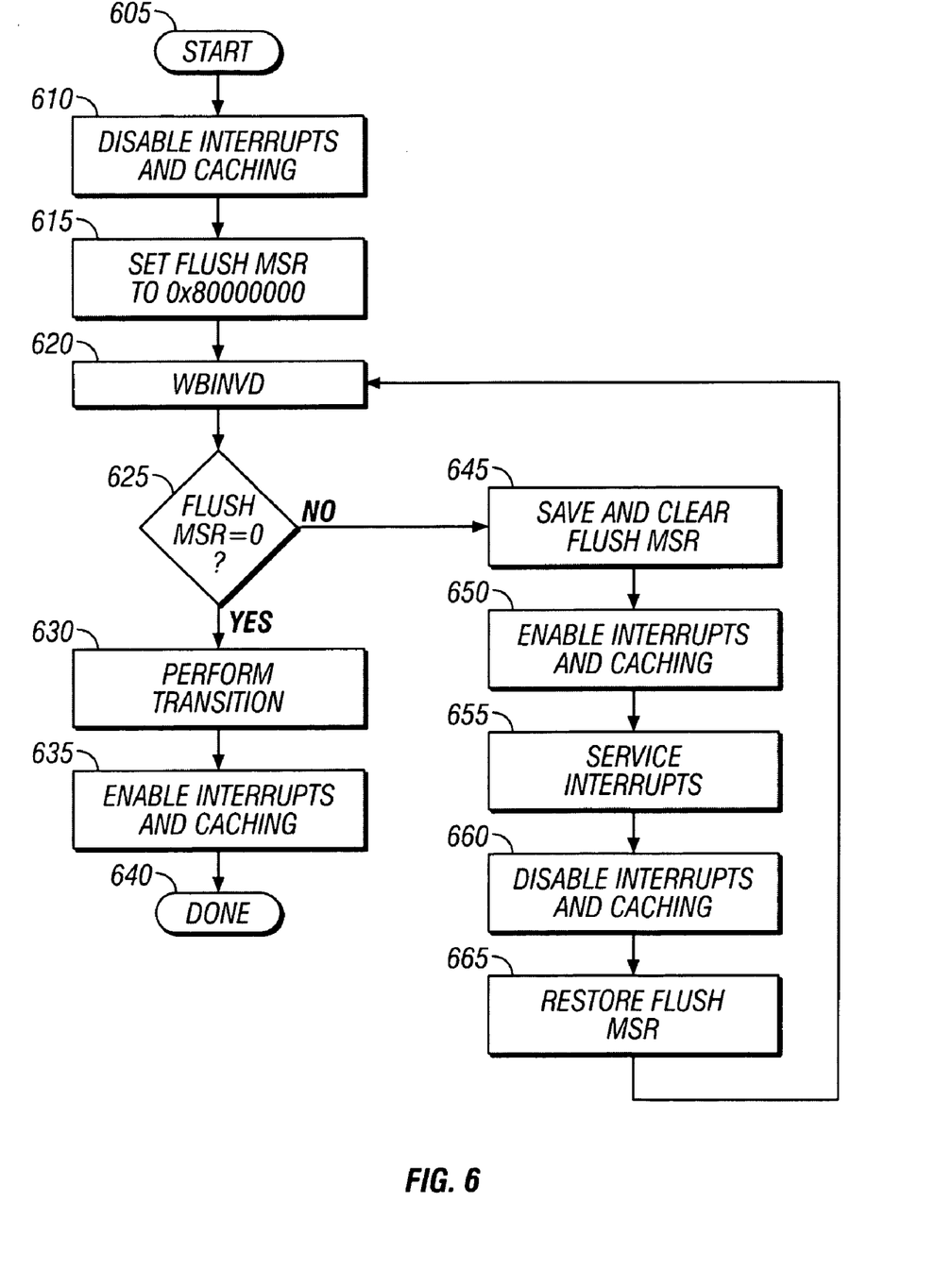
FIG. 6 is a flowchart for an abort/retry flush with processor transition.

In FIG. 6, an abortable L2 cache, flushed prior to a processor state transition, is controlled by microcode. Interrupts and caching are disabled (610). The Flush MSR is initialized (e.g. set to 0x80000000) (615). The WBINVD instruction is executed (620). If the L2 cache is completely flushed (Flush MSR equals zero), then a processor transition is performed (630). Interrupts and caching are enabled (635).

If the Flush MSR was not equal to zero, then the Flush MSR value is saved and Flush MSR is cleared (645). Interrupts and caching are enabled (650) and interrupts are serviced (655). Interrupts and caching are then disabled (660), the Flush MSR is restored (665) and the flush is retried by executing WBINVD again (620).

Figure 7:
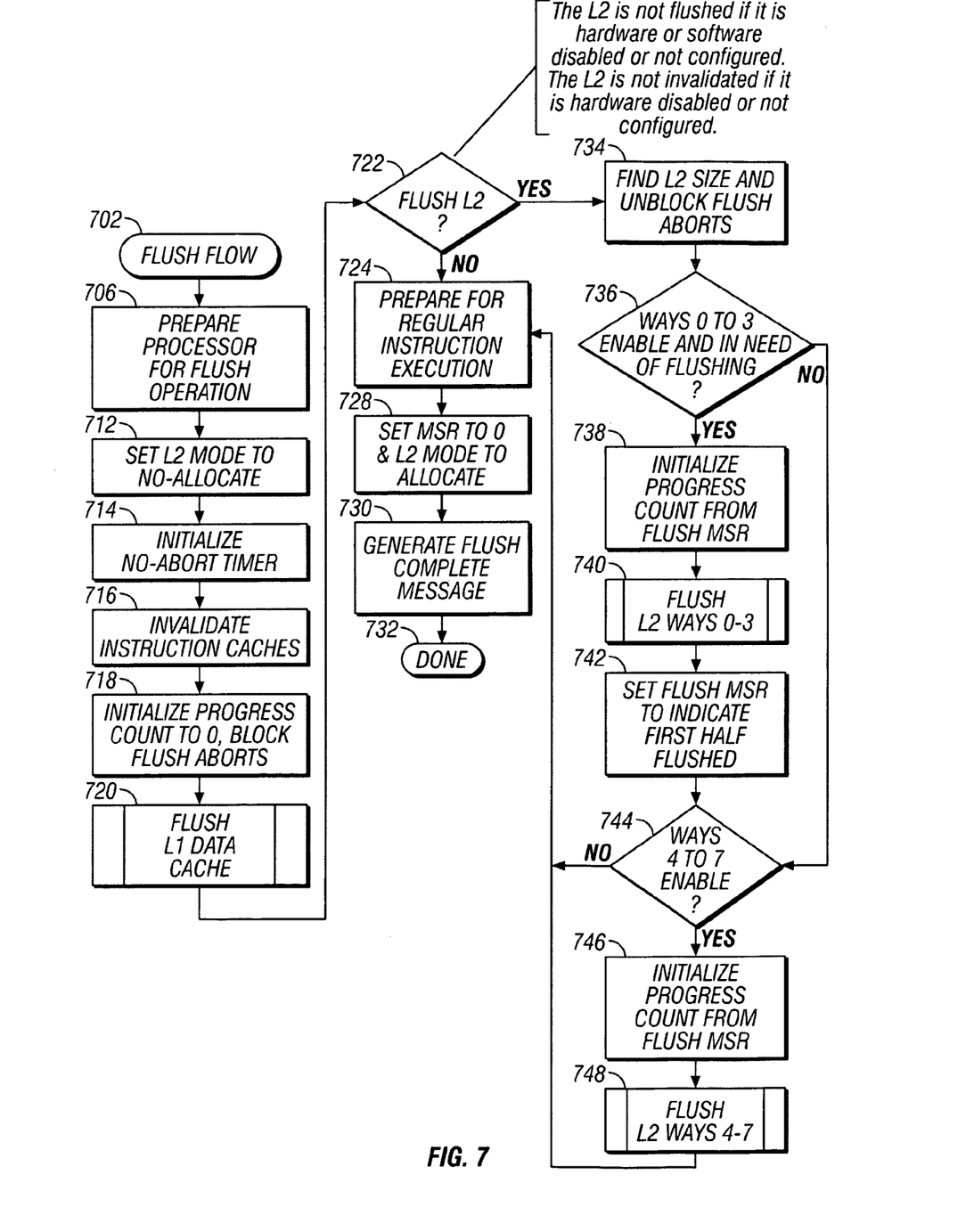
FIG. 7 is a flowchart of microcode for an abortable cache.

Execution of a WBINVD instruction with an abortable cache flush triggers execution of the microcode flow shown in FIG. 7. First the processor is prepared (706) for a flush operation. The L2 cache is then set to "No Allocate" mode (712). In "No Allocate" mode, the processor will be able to access and use the unflushed portions of the cache, but new data from memory will not be written into the cache, even if the processor must fetch data from memory.

The "no-abort" timer is initialized to the "no-abort" time period (714). Until this timer expires, abort requests will be postponed. The L1 instruction caches are invalidated (716). A single segment of code is used for both the L1 and abortable L2 cache. The code must be set up for the proper cache. The progress count is initialized to zero so that the L1 cache flush starts from the beginning of the cache, and flush aborts are blocked (718). The L1 data cache is then flushed (720). If the L2 cache is not being flushed (722), the processor is prepared for regular instruction execution (724). The Flush MSR is set to zero and the L2 cache is set to allocate mode (728). In this configuration, the next flush will be a regular flush. A message is generated indicating that the flush has been completed (730).

If the L2 cache is being flushed, the size of the L2 cache is determined and flush aborts are unblocked (734). The following sequence flushes an eight way L2 cache in two halves of four ways each. First, if ways 0 to 3 are enabled and not flushed (736) then ways 0 to 3 are flushed (740). The Flush MSR is set (742) to indicate that first half of the cache is flushed. If ways 4 to 7 are enabled (744) then the progress count is initialized from the Flush MSR register. If the flush had previously been aborted during the flush of the second half of the cache, then the flow would have come from block 736 directly to block 744 and to block 746. In this case, the Flush MSR would hold the location where the last flush was aborted. Ways 4 to 7 are flushed (748). Alternatively, all ways of an N-way cache can be flushed in one functional block, e.g. block 740. The flow then branches to block 724.

Figure 8:
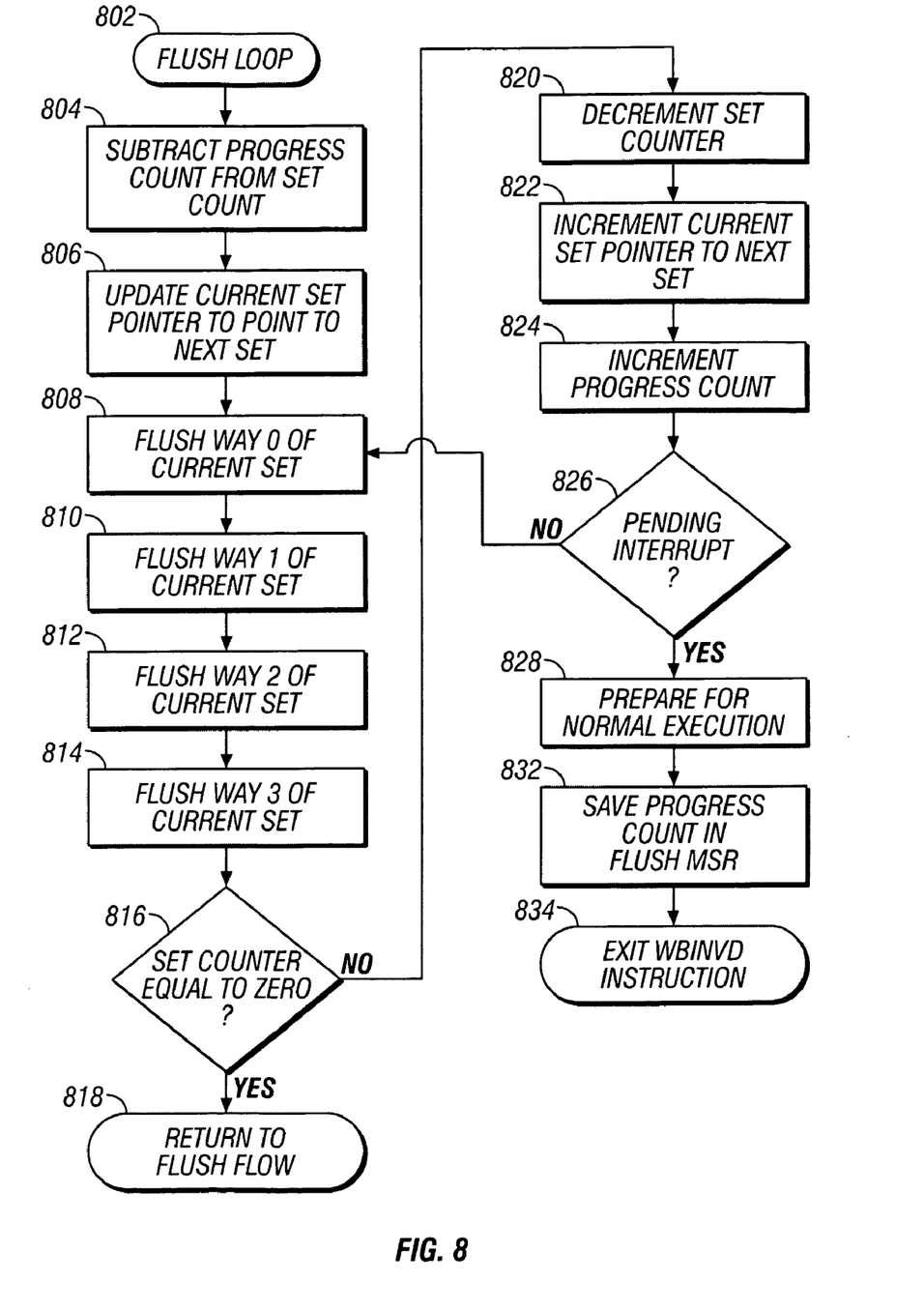
FIG. 8 is a flowchart of microcode for a flush loop.

The flush loop shown in FIG. 8 is executed by the Flush blocks (e.g., blocks 720, 740, and 748) from FIG. 7. The loop starts at block 802. The progress count is subtracted from the set count (804). This value is placed in the set counter. The progress count is indicative of how much of the cache has been flushed. It is derived from the Flush MSR. The set count is the total number of sets in the cache. The set pointer is then set to point to the next set to be flushed (806). The ways of the current half set is flushed (808-814). If all sets are flushed then control returns to the flush flow in FIG. 7.

If sets remain to be flushed (816) then the set counter is decremented (820). The set pointer is incremented to the next set (822). The progress count is also incremented (824). This keeps track of the progress of the flush in case of an abort. If there is no pending interrupt then the flush continues at block 808. If there is a pending interrupt, the processor is prepared for normal execution (828). The progress count is saved in the Flush MSR (832) and the flow exits from the WBINVD instruction (834). Interrupts may now be serviced.

Other embodiment are within the scope of the following claims.

APPENDIX 2.2 Global System State Definitions

. . .

G0—Working:

A computer state where the system dispatches user mode (application) threads and they execute. In this state, devices (peripherals) are dynamically having their power state changed. The user will be able to select (through some user interface) various performance/power characteristics of the system to have the software optimize for performance or battery life. The system responds to external events in real time. It is not safe to disassemble the machine in this state.

. . .

4.7.2.6 Processor Power State Control

ACPI supports placing system processors into one of four power states in the G0 working state. In the C0 state the designated processor is executing code; in the C1-C3 states it is not. While in the C0 state, ACPI allows the performance of the processor to be altered through a defined "throttling" process (the C0 Throttling state in the diagram below). Throttling hardware lets the processor execute at a designated performance level relative to its maximum performance. The hardware to enter throttling is also described in this section.

In a working system (global G0 working state) the OS will dynamically transition idle CPUs into the appropriate power state. ACPI defines logic on a per-CPU basis that the OS uses to transition between the different processor power states. This logic is optional, and is described through the FACP table and processor objects (contained in the hierarchical name space). The fields and flags within the FACP table describe the symmetrical features of the hardware, and the processor object contains the location for the particular CPU's clock logic (described by the P_BLK register block). The ACPI specification defines four CPU power states for the G0 working state: C0, C1, C2 and C3.

In the C0 power state, the processor executes.

In the C1 power state, the processor is in a low power state where it is able to maintain the context of the system caches. This state is supported through a native instruction of the processor (HLT for IA-PC processors), and assumes no hardware support is needed from the chipset.

In the C2 power state, the processor is in a low power state where it is able to maintain the context of system caches. This state is supported through chipset hardware described in this section. The C2 power state is lower power and has a higher exit latency than the C1 power state.

In the C3 power state, the processor is in a low power state where it is not necessarily able to maintain coherency of the processor caches with respect to other system activity (for example, snooping is not enabled at the CPU complex). This state is supported through chipset hardware described in this section. The C3 power state is lower power and has a higher exit latency than the C2 power state.

The P_BLK registers provide optional support for placing the system processors into the C2 or C3 states. The P_LVL2 register is used to sequence the selected processor into the C2 state, and the P_LVL3 register is used to sequence the selected processor into the C3 state. Additional support for the C3 state is provided through the bus master status and arbiter disable bits (BM_STS in the PM1_STS register and ARB_DIS in the PM2_CNT register). System software reads the P_LVL2 or P_LVL3 registers to enter the C2 or C3 power state. Hardware is required to put the processor into the proper clock state precisely on the read operation to the appropriate P_LVLx register.

Processor power state support is symmetric, all processors in a system are assumed by system software to support the same clock states. If processors have non-symmetric power state support, then the BIOS will choose and use the lowest common power states supported by all the processors in the system through the FACP table. For example, if the P0 processor supports all power states up to and including the C3 state, but the P1 processor only supports the C1 power state, then the ACPI driver will only place idle processors into the C1 power state (P0 will never be put into the C2 or C3 power states). Note that the C1 power state must be supported; C2 and C3 are optional. (see the PROC_C1 flag in the FACP table description in section 5.2.5).

4.7.2.6 C2 Power State

The C2 state puts the processor into a low power state optimized around multiprocessor (MP) and bus master systems. The system software will automatically cause an idle processor complex to enter a C2 state if there are bus masters or MP processors active (which will prevent the OS from placing the processor complex into the C3 state). The processor complex is able to snoop bus master or MP CPU accesses to memory while in the C2 state. Once the processor complex has been placed into the C2 power state, any interrupt (IRQ or reset) will bring the processor complex out of the C2 power state.

4.7.2.6.2 C3 Power State

The C3 state puts the designated processor and system into a power state where the processor's cache context is maintained, but it is not required to snoop bus master or MP CPU accesses to memory. There are two mechanisms for supporting the C3 power state:

Having the OS flush and invalidate the caches prior to entering the C3 state.

Providing hardware mechanisms to prevent masters from writing to memory (UP only support).

In the first case the OS will flush the system caches prior to entering the C3 state. As there is normally much latency associated with flushing processor caches, the ACPI driver is likely to only support this in MP platforms for idle processors. Flushing of the cache is through one of the defined ACPI mechanisms (described below, flushing caches).

In UP only platforms that provide the needed hardware functionality (defined in this section), the ACPI driver will attempt to place the platform into a mode that will prevent system bus masters from writing into memory while any processor is in the C3 state. This is done by disabling bus masters prior to entering a C3 power state. Upon a bus master requesting an access, the CPU will awaken from the C3 state and re-enable bus master accesses.

The ACPI driver uses the BM_STS bit to determine which Cx power state to enter. The BM_STS is an optional bit that indicates when bus masters are active. The ACPI driver uses this bit to determine the policy between the C2 and C3 power states: lots of bus master activity demotes the CPU power state to the C2 (or C1 if C2 is not supported), no bus master activity promotes the CPU power state to the C3 power state. The ACPI driver keeps a running history of the BM_STS bit to determine CPU power state policy.

The last hardware feature used in the C3 power state is the BM_RLD bit. This bit determines if the Cx power state is exited based on bus master requests. If set, then the Cx power state is exited upon a request from a bus master; if reset, the power state is not exited upon bus master requests. In the C3 state, bus master requests need to transition the CPU back to the C0 state (as the system is capable of maintaining cache coherency), but such a transition is not needed for the C2 state. The ACPI driver can optionally set this bit when using a C3 power state, and clear it when using a C-C2 power state.

What is claimed is:

1. A system comprising:
    a single level cache comprising a collection of functional portions all operating at a same speed, each functional portion capable of being disabled independently of the other functional portions and capable of being flushed independently of the other functional portions in the collection so that an available size of the single level cache is variable;
    a processor capable of transitioning between a higher power state and a lower power state, where more power is consumed by the processor in the higher power state than in the lower power state;
    a cache controller to control flushing and disabling of the functional portions of the single level cache;
    an abort input to the cache controller to receive an abort signal indicating that a flushing of the single level cache is to be aborted;
    an indicator storage to store an indication of where in the single level cache flushing has been aborted; and
    a counter to identify an initial time in a flush when aborting of a flush is not allowed,
    wherein
    the processor is capable of generating a signal indicative of a transition from the higher power state to the lower power state, and
    the cache controller is to flush and disable a first functional portion of the single level cache in response to the signal indicative of the transition.

2. The system of claim 1, wherein:
    a first flushable portion in the collection comprises a first amount of memory;
    a second flushable portion in the collection comprises a second amount of memory; and
    a ratio of the first amount of memory to the second amount of memory is 2:1.

3. The system of claim 1, further comprising an interrupt indicator that is accessible to identify that an interrupt is pending.

4. A system comprising:
    a single level cache comprising a collection of functional portions all operating at a same speed, each functional portion capable of being disabled independently of the other functional portions and capable of being flushed independently of the other functional portions in the collection so that an available size of the single level cache is variable;
    a processor capable of transitioning between a higher power state and a lower power state, where more power is consumed by the processor in the higher power state than in the lower power state;
    a cache controller to control flushing and disabling of the functional portions of the single level cache;
    an abort input to the cache controller to receive an abort signal indicating that a flushing of the single level cache is to be aborted;
    an indicator storage to store an indication of where in the single level cache flushing has been aborted; and
    a counter to identify an initial time in a flush when aborting of a flush is not allowed.

5. A method, comprising:
    transitioning a processor from a higher power state to a lower power state, where more power is consumed by the processor in the higher power state than in the lower power state, the transitioning including
        flushing and disabling a first functional portion of a single level cache to leave a second functional portion of the single level cache enabled, and
        preventing the processor from servicing an interrupt during the flushing of the first functional portion; and
    performing operations using the processor and the second functional portion of the single level cache with the first functional portion remaining disabled.

6. The method of claim 5,
wherein said flushing and disabling the first functional portion of the single level cache comprises
initiating flushing of the single level cache,
receiving a signal indicating that flushing is to be aborted,
aborting the flushing, and
storing an indication of where in the single level cache flushing has been aborted, the indication demarcating the first functional portion and the second functional portion.

7. The method of claim 5, wherein:
the transitioning comprises generating, at the processor, a signal indicative of a transition from the higher power state to the lower power state; and
the flushing and disabling of the first functional portion is done in response to the signal indicative of the transition.

8. A system comprising:
a single level cache comprising a collection of functional portions all operating at a same speed, each functional portion capable of being disabled independently of the other functional portions and capable of being flushed independently of the other functional portions in the collection so that an available size of the single level cache is variable;
a processor capable of transitioning between a higher power state and a lower power state, where more power is consumed by the processor in the higher power state than in the lower power state; and
a cache controller to control flushing and disabling of the functional portions of the single level cache,
wherein
the processor, in transitioning from the higher power state to the lower power state, is configured to flush and disable a first functional portion of the single level cache to leave a second functional portion of the single level cache enabled,
a servicing of an interrupt by the processor is delayed until after the flushing of the first functional portion, and
the processor and the second functional portion of the single level cache can perform operations with the first functional portion disabled.

* * * * *